E. C. HOPPING.
Mechanical Movements.

No. 137,924.  Patented April 15, 1873.

Witnesses.  Inventor.

UNITED STATES PATENT OFFICE.

EUGENE C. HOPPING, OF MADISON, NEW JERSEY, ASSIGNOR OF ONE-HALF HIS RIGHT TO E. A. ELY, OF SAME PLACE.

IMPROVEMENT IN MECHANICAL MOVEMENTS.

Specification forming part of Letters Patent No. 137,924, dated April 15, 1873; application filed April 10, 1873.

*To all whom it may concern:*

Be it known that I, EUGENE C. HOPPING, of Madison, in the county of Morris and State of New Jersey, have invented a certain Improved Mechanical Movement, of which the following is a specification:

This invention relates to mechanisms for converting continuous rotary into reciprocating motion, and is more especially designed for use upon machines in which the rotary motion is transmitted from a localized device to a reciprocating device, which is also capable of oscillating on an axis. My improvement consists in certain novel combinations of mechanical elements, which enable the rotary device to move the reciprocating one on any radius proceeding from its axis.

Figure 1:
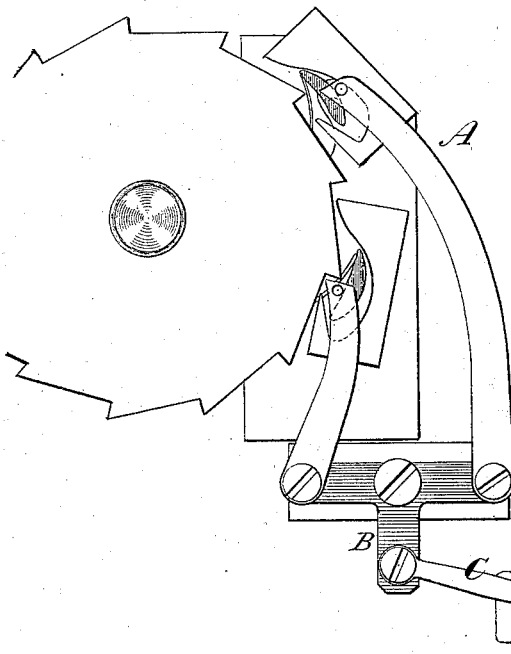
Figures 2, 3:
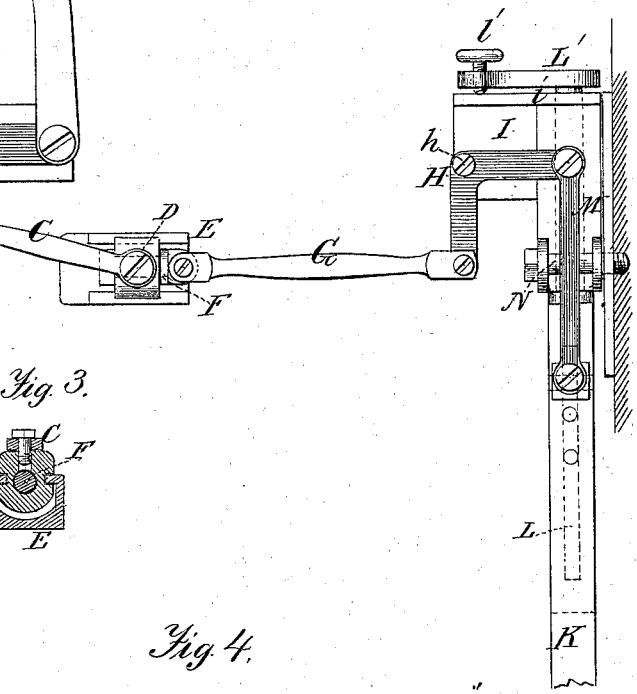
Figure 4:
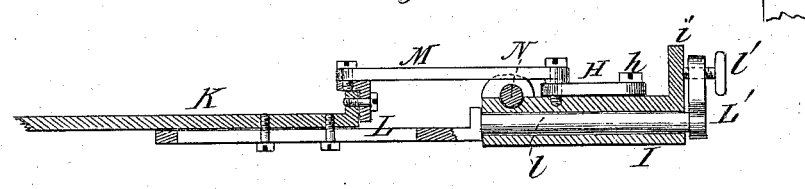

Figure 1 is a plan view of my improvement. Figs. 2, 3, and 4 are sectional views of detached parts, hereinafter more specifically alluded to.

The same letters of reference are used in all the figures in the designation of identical parts.

The annexed drawing illustrates my improvement as applied for driving the cutter-bar of a harvester, and the rotary motion proceeds from an escapement-like contrivance, A, (constructed as described in my Letters Patent No. 132,833, granted to me November 5, 1872,) which gives an oscillating motion to the T-lever B, to which one end of the pitman C is pivoted. The other end of this pitman is pivoted to a cross-head, D, which is placed upon and slides on fixed ways or guides E. The cross-head D is bored longitudinally, and there provided with a pin, F, which is capable of turning in the cross-head, and is connected by the rod G to one arm of a bell-crank lever, H, which turns on the fulcrum $h$ on the shoe I. The cutter-bar K is attached to and slides upon a bar, L, which projects from the shoe I, and has its bearings therein. The cylindrical end $l$ of this bar projects beyond its bearings in the shoe, and carries a fixed arm, L', by means of which it can be turned to throw the points of the cutter-bar up to any desired angle. After proper adjustment of the knife the set-screw $l'$ of the arm L' is screwed forcibly against the plate $i$ of the shoe to hold the bar L and cutter-bar in the desired position. The heel of the cutter-bar is connected by the rod M to the other arm of the bell-crank H. The shoe I turns upon a stud, N, which in the example shown, is fixed with its axis in line with the axis of the pin F, and the relative arrangement of the stud N and cutter-bar is such that the latter moves on lines about radial to the axis of the former.

It will be apparent that in swinging the cutter-bar the relative positions of the bell-crank and connecting-rods G and M with reference to it remain undisturbed on account of the swiveling connection of the rod G with the cross-head D. In case the pivotal point of the shoe I is movable with reference to the axis of the cross-head D, the connections of the rod G with the pin F and bell-crank H must be universal joints.

My improvement is applicable to sewing-machines, sawing-machines, and a great variety of other machines in which means are used for converting rotary into reciprocating motion.

What I claim as my invention, and desire to secure by Letters Patent, is—

The combination, with a crank or rotary device, A, of pitman C, cross-head D sliding on fixed guides E, swiveling-pin F, connecting-rod G, bell-crank H turning on a fulcrum of an oscillatory support, I N, connecting-rod M, and a reciprocating device, K, carried upon the oscillatory support I N, substantially as and for the purpose specified.

In testimony whereof I have signed my name to this specification in the presence of two subscribing witnesses.

E. C. HOPPING.

Witnesses:
B. EDW. J. EILS,
A. RUPPERT.